United States Patent [19]

Kasi et al.

[11] Patent Number: 4,772,440
[45] Date of Patent: Sep. 20, 1988

[54] METHOD FOR PRODUCTION OF POROUS MEMBRANE

[75] Inventors: Masaaki Kasi, Fuji; Noriyuki Koyama, Fujinomiya, both of Japan

[73] Assignee: Terumo Kabushiki Kaisha T/A Terumo Corp., Tokyo, Japan

[21] Appl. No.: 929,380

[22] Filed: Nov. 12, 1986

[30] Foreign Application Priority Data

Nov. 14, 1985 [JP] Japan .................................. 60-253641

[51] Int. Cl.$^4$ ........................... C08J 9/28; B29C 39/00
[52] U.S. Cl. .................................. 264/41; 210/500.36; 264/216; 264/331.17
[58] Field of Search ..................... 264/41, 216, 331.17; 210/500, 36

[56] References Cited

U.S. PATENT DOCUMENTS 3,928,517 12/1975 Knight et al. .................... 264/41 X
4,203,848 5/1980 Grandine, II ..................... 264/41 X
4,444,716 4/1984 Aoyagi et al. ................... 264/199 X

FOREIGN PATENT DOCUMENTS 0160551 11/1985 European Pat. Off. .
2391837 12/1978 France .
2506792 12/1982 France .
48-8740 3/1973 Japan .
58-91732 5/1983 Japan .

*Primary Examiner*—Philip Anderson
*Attorney, Agent, or Firm*—Burns, Doane Swecker & Mathis

[57] ABSTRACT

In a method for the manufacture of a porous membrane by the steps of causing a polymer solution to flow and spread in a uniform thickness on a substrate and solidifying the formed layer of the polymer solution in a bad solvent, the improvement which comprises using a fluorinated hydrocarbon as the bad solvent and optionally carrying out the removal of a good solvent mingling into the fluorinated hydrocarbon during the course of the solidification by the technique of extraction from water, and repeating the fluorinated hydrocarbon.

12 Claims, 1 Drawing Sheet

METHOD FOR PRODUCTION OF POROUS MEMBRANE

BACKGROUND OF THE INVENTION

1. Field of the Invention

This invention relates to a method for the production of a porous membrane. More particularly, it relates to a method for the production of a porous membrane by the steps of dissolving a polymer in a good solvent therefor, causing the resulting solution to flow and spread in a uniform thickness on a substrate, then solidifying the layer of the solution in a bad solvent therefor, which method is easy, quick, and safe from the operational point of view.

2. Description of the Prior Art

Heretofore, as means of producing porous membranes of macromolecular substances for various forms of filtration and dialysis, (1) a dry method which comprises dissolving a polymer in a mixture of a good solvent for the polymer and a poor solvent therefore intimately miscible therewith, causing the resulting solution of flow and spread in a uniform thickness of a substrate, and thereafter expelling the solvent from the layer of the solution by evaporation under carefully controlled conditions, (2) a wet method which comprises dissolving a polymer in a good solvent therefor, causing the resulting solution to flow and spread in a uniform thickness on a substrate, and then solidifying the layer of the solution in a bad solvent therefor, (3) a method which comprises dispersing a soluble substance in a polymer molding the resulting mixture in the shape of a membrane, and thereafter removing the soluble substance from the membrane, (4) a method which resides in stretching a membrane under specific conditions, and (5) a method which comprises forming micropores in part of a polymer by means of a radiation or an electron beam and dissolving the part thereby enlarging the pores have been known to the art. In these methods for the production of a porous membrane, the dry method of (1) has a disadvantage that the conditions for the distillation of the solvent are difficult to control, the method of (3) has a problem that thorough removal of the soluble substance from the polymer is not easy and the micropores lack uniformity, the method of (4) has a strong possibility that since the membrane, for the formation of micropores, is exposed to a stretching force, it will suffer its own performance to be impaired by such external influences as heat, and the method of (5) has a drawback that it requires provision of an expensive apparatus and entails a complicate procedure. In contrast, the wet method of (2) permits manufacture of the membrane under easily controllable conditions as compared with the other methods and has no use for any special device. As means of providing a porous membrane of highly satisfactory performance, this method has found popular utility for a wide variety of polymers.

When this wet method is adopted in the manufacture of a porous membrane of polyvinylidene fluoride, for example, it has been customary to use, as a bad solvent therefor, a solvent using water or a lower alcohol as a main component as proposed in Japanese Patent Publication SHO 48(1973)-8,740. Because of the flammability inherent in any alcohol, this bad solvent requires stringent management as for the prevention of accident. Further, since this bad solvent is destined to mingle with the good solvent to be added during the course of the solidification of the polymer solution, reclamation of the bad solvent requires fractional distillation for the separation thereof from the good solvent. This treatment is expensive and encounters the difficulty to be involved in the isolation of the azeotrope. Use of water or a mixture of water with a good solvent in the manufacture under discussion has been proposed as indicated in U.S. Pat. No. 4,203,848 and Japanese Patent Laid-Open SHO 58(1983)-91,732. By the mixing ratio of water with the good solvent, the structure of the membrane to be produced can be controlled. Again in this case, the removal of this mixed solvent from the good solvent to be added during the course of the solidification proves to be a difficult and expensive treatment. Moreover, because of the high boiling point inherent in water, the porous membrane obtained by this method requires a very lengthy drying treatment.

An object of this invention is to provide a method for the manufacture of an improved porous membrane.

Another object of this invention is to provide a method for the manufacture of a porous membrane by the steps of dissolving a polymer in a good solvent therefor, causing the resulting solution to flow and spread in a uniform thickness on a substrate, and solidifying the resulting layer of the solution in a bad solvent therefor, which method is easy, quick, and safe from the procedural point of view.

A further object of this invention is to provide a method for the manufacture of a porous membrane, which method is advantageously applicable to the manufacture of a porous membrane of fluorine type resin.

SUMMARY OF THE INVENTION

The above mentioned objects are accomplished by a method for the manufacture of a porous membrane by the steps of dissolving a polymer in a good solvent therefor, causing the resulting solution to flow and spread in a uniform thickness on a substrate, and solidifying the resulting layer of the solution in a bad solvent therefor, which method is characterized by using a fluorinated hydrocarbon as the bad solvent.

The first aspect of this invention resides in a method for the manufacture of a porous membrane which uses a fluorinated hydrocarbon selected from the group consisting of trichlorotrifluoroethane, tetrachlorodifluoroethane, dibromotetrafluoroethane, trichloromonofluoromethane, and mixtures thereof as a poor solvent. The first aspect of the invention discloses a method for the manufacture of a porous membrane which uses a fluorine type resin as a polymer. The first aspect of the invention further discloses a method for the manufacture of a porous membrane which uses a fluorine type resin from the group consisting of vinylidene fluoride homopolymer, copolymers of vinylidene fluoride with other monomers, and combinations of these polymers with other polymers as a polymer. The first aspect of the invention also discloses a method for the manufacture of a porous membrane which uses at least one member selected from the group consisting of dimethyl formamide, dimethyl acetamide, dimethyl sulfoxide, methylethy ketone, acetone, tetrahydrofuran, and mixtures thereof as a good solvent. The first aspect of the invention also discloses a method for the manufacture of a porous membrane which uses paper or mixed paper as a substrate.

The above mentioned objects are accomplished by a method for the manufacture of a porous membrane by the steps of dissolving a polymer in a good solvent therefor, causing the resulting solution to flow and spread in a uniform thickness on a substrate, and solidifying the resulting layer of the solution in a bad solvent therefor, which method is characterized by using a fluorinated hydrocarbon as the bad solvent, carrying out the removal of the good solvent to be added to the fluorinated hydrocarbon during the course of the solidification of the polymer solution by the technical of extraction from water, and using the fluorinated hydrocarbon so recovered repeatedly.

This second aspect of the present invention discloses a method for the manufacture of a porous membrane which uses a fluorinated hydrocarbon selected from the group consisting of trichlorotrifluoroethane, tetrachlorodifluoroethane, dibromotetrafluoroethane, trichloromonofluoromethane, and mixtures thereof as a poor solvent. The second aspect of the invention also discloses a method for the manufacture of a porous membrane which uses a fluorine type resin as a polymer. The second aspect of the invention further discloses a method for the manufacture of a porous membrane which uses a fluorine type resin from the group consisting of vinylidene fluoride homopolymer, copolymers of vinylidene fluoride with other monomers, and combinations of these polymers with other polymers as a polymer. The second aspect of the invention also discloses a method for the manufacture of a porous membrane which uses at least one member selected from the group consisting of dimethyl formamide, dimethyl acetamide, dimethyl sulfoxide, methylethyl ketone, acetone, tetrahydrofuran, and mixtures thereof as a good solvent. The second aspect of this invention discloses a method for the manufacture of a porous membrane which uses paper or mixed paper as a substrate.

DESCRIPTION OF PREFERRED EMBODIMENT

Figure 1:
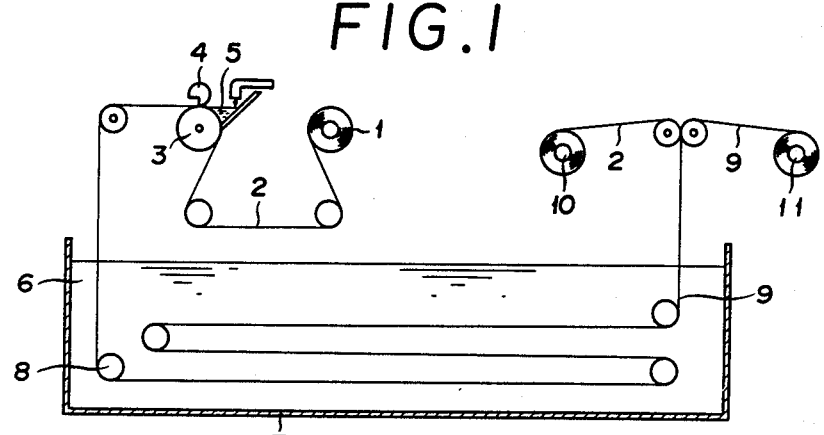
FIG. 1 and FIG. 2 are schematic diagrams of production apparatuses to be used in the manufacture of a porous membrane as embodiments of the present invention.

Now, the present invention will be described more specifically with reference to an embodiment thereof.

The method for the manufacture of a porous membrane as the first aspect of this invention represents a partial improvement in the method which comprises for the manufacture of a porous membrane by the steps of dissolving a polymer in a good solvent therefor, causing the resulting solution to flow and spread in a uniform thickness on a substrate, and solidifying the resulting layer of the solution in a bad solvent therefor. It characteristically uses a fluorinated hydrocarbon as the bad solvent in the manufacture of the porous membrane.

The term "bad solvent" as used in this specification means a solvent which is sparingly capable or absolutely incapable of dissolving the polymer. The term "good solvent" as used herein means a solvent which is capable of dissolving the polymer at temperatures not exceeding the melting point of the polymer. The "bad solvent" and the "good solvent" mentioned above have affinity for each other and are compatible with each other.

The fluorinated hydrocarbon to be used as a bad solvent is desired to be liquid at normal room temperature, to possess a boiling point not very high, and to be dried by an easy treatment. As examples of the fluorinated hydrocarbon answering the description, there can be cited trichlorotriuoroethane, tetrachlorodifluoroethane, dibromotetrafluoroethane, trichloromonofluoromethane, and mixtures thereof. Among other fluorinated hydrocarbons cited above, such fluorinated hydrocarbons as trichlorotrifluoroethane and dibromotetrafluoroethane which have relatively low boiling points prove particularly desirable. When such a fluorinated hydrocarbon as mentioned above is used as a bad solvent, the time required for the drying treatment of the produced porous membrane can be shortened. Generally fluorinated hydrocarbons have high affinity for many organic solvents which are used as good solvents for polymers. When the polymer solution deposited as described above on the substrate is solidified by immersion in the bad solvent, the good solvent contained in the polymer solution can be satisfactorily extracted from the solution and passed into the bad solvent. As the result, the produced membrane possesses a highly preferable porous structure. Further, since the fluorinated hydrocarbon is inherently nonflammable, such special consideration as provision of an explosion-proof structure which has been an absolute necessity when an alcohol is used as a bad solvent can be obviated.

The method of this invention for the manufacture of a porous membrane can be applied effectively to any polymer which is insoluble in the fluorinated hydrocarbon and which permits adoption of an organic solvent of high affinity for the fluorinated hydrocarbon as a good solvent. As examples of the polymer answering the description, there can be cited polyamide resin, polyacetal resin, and fluorine type resins. In consideration of material strength, fluorine type resins prove desirable selections. Among other fluorine type resins, vinylidene fluoride type resins are particularly desirable selections. The molecular weight of the fluorine type resin is desired to be in the range of $1.0 \times 10^5$ to $1.0 \times 10^6$ preferably $3.0 \times 10^5$ to $5.0 \times 10^5$. Typical examples of the vinylidene fluoride type resin include vinylidene fluoride homopolymer, copolymers of vinylidene fluoride as a main component with other copolymerizable monomers such as ethylene tetrafluoride, methyl acrylate, and propylene hexafluoride, and combinations of these polymers with other polymers. The amount of the copolymerizable monomer in the copolymer is desired to be not more than 50% by weight, preferably not more than 20% by weight. The amount of the other polymer mentioned above is desired to be not more than 80% by weight, preferably not more than 50% by weight.

Examples of the good solvent, when a vinylidene fluoride type resin is used as a polymer, for instance include ketones such as acetone, methylethyl ketone, diethyl ketone, methylpropyl ketone, methylbutyl ketone, methylisopropyl ketone, and cyclohexanone, ethers such as tetrahydrafuran, tetrahydrofuran, and 1,4-dioxane, amides such as dimethyl formamide and dimethylacetyl amide, and sulfoxides such as dimethyl sulfoxide. Among the good solvents cited above, dimethyl formamide, dimethyl acetamide, dimethyl sulfoxide, methylethyl ketone, acetone, and tetrahydrofuran are desirable selections. A mixture of dimethyl formamide with acetone is the best selection.

In the method of this invention for the manufacture of a porous membrane, the polymer of the description is dissolved in a good solvent therefore to prepare a polymer solution. The polymer concentration in the polymer solution is desired to be in the range of 10 to 25% by weight, preferably 15 to 20% by weight.

The polymer solution prepared as described above is applied or sprayed on a substrate by the use of a doctor knife or a curtain coater, for example, to form a layer of the solution in a uniform thickness in the range of 100 to 1,000 μm, preferably 300 to 600 μm, for example. Examples of the substrate usable advantageously herein include paper, glass sheet, a metallic specular sheet, polymer mixed papers of polyethylene, polypropylene, polyester film, nylon and polyester typefilm or polyoletine typefilm. Among the substrates cited above, paper and polymer mixed paper prove particularly desirable. Such polyolefin mixed papers such as of polyethylene, polypropylene polyester typefilm and polyoletine typefilm are most desirable. This is because such a desirable substrate possesses a surface property capable of suppressing shrinkage of the porous membrane during the vaporization of the fluorinated hydrocarbon which has displaced the good solvent and, after ward, facilitating the separation of the porous membrane from the substrate.

The substrate on which the polymer solution has been deposited as described above is immediately immersed in the bath of a fluorinated hydrocarbon as a bad solvent. This immersion is desired to be carried out in such a manner that the side of the substrate supporting the layer of the polymer solution will face the bottom of the bath. This is because the fluorinated hydrocarbon has a fairly large specific gravity and the polymer solution possibly separates from the substrate and floats up in the bath during the course of the immersion. The good solvent contained in the polymer solution is removed from the polymer solution by the fact that it diffuses into the fluorinated hydrocarbon as the bad solvent. Consequently, the polymer solution undergoes change of composition and is solidified through the phenomenon of gelation. During the progress of this gelation, since the fluorinated hydrocarbon which as the bad solvent has displaced the good solvent is present between the polymer particles, the cohesion of molecules is checked to some extent and the gelling polymer solution is allowed to acquire a porous structure. The immersion of the polymer solution in the fluorinated hydrocarbon must last until the polymer solution is solidified to an extent of acquiring the porous structure. The immersion time is generally in the range of 1 to 10 minutes, preferably 3 to 5 minutes.

When the solidification of the polymer solution in the fluorinated hydrocarbon as the bad solvent is completed, the porous membrane produced as still deposited on the substrate is taken out of the bath of fluorinated hydrocarbon and then dried to expel the residual fluorinated hydrocarbon adhering to the porous membrane. Since fluorinated hydrocarbons are generally low-boiling compounds as described above, the drying of the produced porous membrane can be completed in a short span of time without substantially requiring any extra treatment such as application of heat.

Now, the present invention will be described below more specifically with reference to the accompanying drawings.

FIG. 1 is a schematic diagram of a production apparatus to be used in the manufacture of a porous membrane as one embodiment of this invention. By the use of this production apparatus, the porous membrane can be continuously produced. First, on a substrate 2 of the shape of a belt fed out of a roll 1 of substrate at a fixed speed approximately in the range of 0.1 to 3.0 m/min, a polymer solution 5 is applied thinly and uniformly with the aid of a doctor knife 4 while the substrate 2 is in the process of sliding on a support roll 3. The substrate 2 is immediately led to a coagulation bath 7 containing a fluorinated hydrocarbon 6, passed around a direction-changing bar 8 so that the side of the substrate 2 supporting the applied layer of the polymer solution 5 will fall on the lower side in the coagulation bath 7, and moved in the coagulation bath 7 to effect coagulation of the polymer solution 5. When the polymer solution 5 is solidified and consequently turned into a porous membrane 9, the substrate is pull up from the coagulation bath 7. While the substrate is in the process of moving toward a takeup roll 10, it is exposed to room temperature for expulsion of the fluorinated hydrocarbon still adhering to the porous membrane 9 and the substrate 2 by distillation. Thereafter, the porous membrane 9 as deposited on the substrate 2 is wound up on the takeup roll 10. The porous membrane thus wound on the takeup roll 10 can be preserved as lined with the substrate 2 until it is put to use. Optionally, after this drying, the substrate 2 and the porous membrane 9 are separated from each other and the substrate 2 is wound on a roll 10 and the porous membrane on a roll 11 respectively.

The porous membrane produced as described above has a wall thickness in the range of 50 to 170 μm, preferably 80 to 150 μm, a porosity in the range of 50 to 90%, preferably 70 to 85%, and an average pore diameter in the range of 0.1 to 1.0 μm, preferably 0.2 to 0.6 μm. It is suitably used as a filter for separation of microorganisms and as a membrane for separation of blood plasma in the pharmaceutical and medical fields.

The method of the second aspect of the present invention for the manufacture of a porous membrane represents a partial improvement in and concerning the conventional method which comprises the steps of dissolving a polymer in a good solvent therefor, causing the resulting solution to flow and spread in a uniform thickness on a substrate, and solidifying the resulting layer of the solution in a poor solvent therefor. Similarly to the first aspect of the invention, it is characterized by using a fluorinated hydrocarbon as a bad solvent and carrying out the removal of a good solvent to be added to the fluorinated hydrocarbon during the course of the solidification of the polymer solution by the technique of extraction from water.

In the wet method, the requirement that the concentration of the bad solvent in the coagulation bath should be kept below a fixed level by separating the good solvent added to the bad solvent during the course of the coagulation constitutes an important problem regarding the control of the porous structure of the membrane. Heretofore, this separation has been generally effected by fractional distillation utilizing difference of boiling point and, consequently, entailing an appreciably expensive and time-consuming treatment. In contrast, in the present invention, a fluorinated hydrocarbon is used as a bad solvent. Generally, fluorinated hydrocarbons characteritically possess high affinity for many organic solvents and exhibit substantially no compatibility with water. When water is stirred in a fluorinated hydrocarbon containing a good solvent, therefore, the good solvent passes for the fluorinated hydrocarbon layer to the water layer and the good solvent can be easily extracted from the fluorinated hydrocarbon as the bad solvent. The water can be easily removed from this mixed system because it has a smaller specific gravity than the fluorinated hydrocarbon and is allowed to form an upper layer. Since this invention removes the good solvent mingling in the bad solvent by the technique of extraction from water as described above, the fluorinated hydrocarbon as the bad solvent can be purified very easily and it can be used repeatedly.

The procedure of the manufacture of the porous membrane by the method of the second aspect of this invention is identical with that of the method of the first aspect of this invention, excepting the step of purifying the fluorinated hydrocarbon as the bad solvent to be performed after the concentration thereof is lowered by the inclusion of the good solvent has fallen to a fixed level is effected by the technique of extraction from water is added. Naturally, the polymer, the good solvent, the bad solvent, and the substrate to be used therein are identical to those of the first aspect of the invention.

Now, the present invention will be described below specifically with reference to working examples.

EXAMPLE 1

In 61.5 parts by weight of acetone and 20.5 parts by weight of dimethyl formamide, 18 parts by weight of polyvinylidene fluoride (molecular weight: 300,000–500,000) (hereinafter referred to briefly as "PVdF") (produced by Penwalt and marketed under the trademark designation of "Kynar 301F") was dissolved by heating. The produced polymer solution was left cooling to room temperature. This polymer solution was caused to flow and spread in a thickness of about 400 μm on a flat, smooth glass sheet, immediately immersed in trichlorotrifluoroethane (produced by Daikin Kogyo Co., Ltd. and marketed under the trademark designation of "Daiflon S-3") and left standing therein for 5 minutes, and then dried at room temperature. A porous membrane thus produced was separated from the glass sheet. The porous membrane had a wall thickness of 123 μm and a porosity of 80.2%. When this porous membrane was rendered hydrophilic by a treatment with ethanol and put to use, it showed a water permeability of 33.4 ml/cm$^2$.min (10 psi, 25° C.). It removed polystyrene latex particles exceeding 0.46 μm in diameter at a rate of not less than 95%.

EXAMPLE 2

In 61.5 parts by weight of acetone and 20.5 parts by weight of dimethyl formamide, 18 parts by weight of vinylidene fluoride-ethylene tetrafluoride copolymer (molecular weight 3.0×10$^5$) (produced by Penwalt and marketed under the trademark designation of "Kynar 7201") was dissolved by heating. A polymer solution formed consequently was left cooling to room temperature. This polymer solution was caused to flow and spread in a thickness of about 400 μm on a flat, smooth glass sheet, immediately immersed in trichlorotrifluoroethane (produced by Daikin Kogyo Co., Ltd. and marketed under trademark designation of "Daiflon S-3") and left standing therein for 5 minutes and then dried at room temperature. A porous membrane consequently formed was removed from the glass sheet. This porous membrane had a wall thickness of 120 μm and a porosity of 71.5%. When it was rendered hydrophilic by a treatment with ethanol and put out use, it showed a water permeation of 44.6 ml/cm$^2$.min (10 psi, 25° C.). It removed polystyrene latex particles exceeding 0.65 μm in diameter at a ratio of not less than 95%.

EXAMPLE 3

In 61.5 parts by weight of acetone and 20.5 parts by weight of dimethyl formamide, a mixture of 12.6 parts by weight of PVdF (produced by Penwalt and marketed under the trademark designation of "Kynar 301F") with 5.4 parts by weight of polymethyl methacrylate (produced by Kyowa Gas Chemical Industry Co., Ltd. and marketed under the trademark designation of "PARAPET-GF1000") was dissolved by heating. A polymer solution consequently formed was then left cooling to room temperature. This polymer solution was caused to flow and spread in a thickness of 500 μm on a flat, smooth glass sheet, immediately immersed in trichlorotrifluoroethane (produced by Daikin Kogyo Co., Ltd. and marketed under the trademark designation of "Daiflon S-3") and left standing therein for 5 minutes and dried at room temperature. A porous membrane consequently formed was removed for the glass sheet. This porous membrane had a wall thickness of 143 μm and a porosity of 81.4%. When it was rendered hydrophilic by a treatment with ethanol and put to use, it showed a water permeability of 38.7 ml/cm$^2$.min (10 psi, 25° C.). It removed polystyrene latex particles 0.46 μm in diameter at a ratio of not less than 95%.

EXAMPLE 4

A mixture of 12.6 parts by weight of PVdF (produced by Penwalt and marketed under the trademark designation of "Kynar 301F") with 5.4 parts by weight of vinyl alcohol-vinyl acetate copolymer (produced by Shin-etsu chemical Industry Co., Ltd. and marketed under product code of "SMR-80L") was dissolved in 61.5 parts by weight of acetone and 20.5 parts by weight of dimethyl formamide by heating. A polymer solution consequently formed was left cooling room temperature. This polymer solution was caused to flow and spread in a thickness of 500 μm on a flat, smooth glass sheet, immediately immersed in trichlorotrifluoroethane (produced by Daikin Kogyo Co., Ltd. and marketed under the trademark designation of "Daiflon S-3") and left standing therein for 5 minutes and dried at room temperature. A porous membrane consequently formed was separated from the glass sheet. This porous membrane had a wall thickness of 131 μm and a porosity of 72.4%. When it was put to use in its unmodified form, it showed sufficient hydrophilicity and had a water permeation of 30.6 ml/cm$^2$.min (10 psi, 25° C.). It removed polystyrene latex particles 0.46 μm in diameter in a ratio of not less than 95%.

EXAMPLE 5

In 61.5 parts by weight of acetone and 20.5 parts by weight of dimethyl formamide, 18 parts by weight of PVdF (produced by Penwalt and marketed under the trademark designation of "Kynar 301F") was dissolved by heating. A polymer solution formed consequently was left cooling to room temperature. This polymer solution was caused to flow and spread in a thickness of 300 μm on a flat, smooth polyethylene mixed paper (produced by Kohjin Co., Ltd.) paid out of a roll, passed through trichlorotrifluoroethane (produced by Daikin Kogyo Co., Ltd. and marketed under the trademark designation of "Daiflon S-3") with 5 minutes' retention, drawn out of th bath, and dried at room temperature. A porous membrane consequently formed was separated from the substrate. The porous membrane had a wall thickness of 88 μm and a porosity of 79.3%. When it was rendered hydrophilic by a treatment with ethanol and put to use, it showed a water permeation of 33.9 ml/cm$^2$.min (10 psi, 25° C.). It removed polystyrene latex particles 0.46 μm in diameter at a ratio of not less than 95%.

EXAMPLE 6

Figure 2:
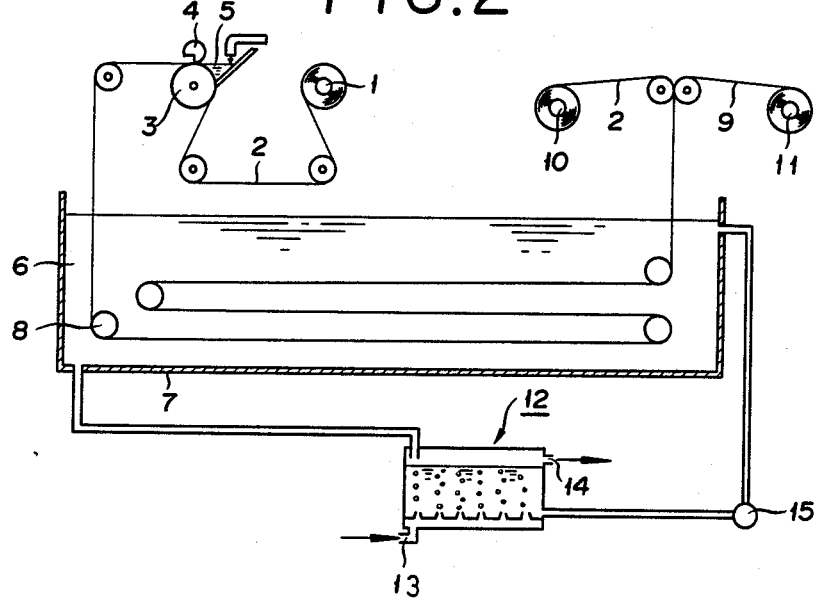

A polymer solution was obtained by following the procedure of Example 5. Then, by the use of an apparatus configured as illustrated in FIG. 2, this polymer solution 5 was caused to flow and spread in a thickness of 300 μm with a doctor knife 4 on a polyethylene mixed solution as a substrate 2 (produced by Kohjin Co., Ltd.) in a width of 200 mm, passed through a coagulation bath containing 100 liters of trichlorotrifluoroethane (produced by Daikin Kogyo Co., Ltd.) with 5 minutes' retention, drawn out of the bath, and dried at room temperature. A porous membrane 9 consequently formed was wound on a takeup roll 10. During this operation, the trichlorotrifluoroethane was led in a flow volume of 30 liters/hr to a water-bubble type extraction tank 12, caused to release the dissolved good solvent into water, and returned via a pump 15 to the coagulation bath 7. For this treatment, the water was used at a rate of 100 liters/hr. During this operation, the concentration of the good solvent in the coagulation bath 7 was kept below 2% by volume.

The porous membrane consequently obtained retained a stable performance, possessing a wall thickness of 80 to 90 μm, a porosity of 78 to 80%, and a water permeability of 32 to 36 ml/cm$^2$. min (10 psi, 25° C.). It stably removed polystyrene latex particles 0.46 μm in diameter at a rate of not less than 95%.

In FIG. 2, reference numeral 13 denotes a water inlet and reference numeral 14 a water outlet.

EXAMPLE 7

A polymer solution was obtained by following the procedure of Example 5. Then, by the use of an apparatus configured as illustrated in FIG. 1, this polymer solution was applied with a doctor knife in a thickness of 500 μm and a width of 200 mm on a polyester film (produced by Nimura Industries and marketed under the product code of "FE-1000-25") in a width of 320 mm as a substrate 2, passed through a coagulation bath 7 containing trichlorotrifluoroethane (produced by Daikin Kogyo Co., Ltd. and marketed under the trademark designation of "Daiflon S-3") with 5 minutes' retention, then drawn out of the bath, and dried. A porous membrane 9 consequently formed was separated from the substrate. The porous membrane 9 was wound on a roll 11 and the substrate on a roll 10.

The porous membrane had a wall thickness of 140 to 150 μm, a porosity of 78 to 80%, and a water permeation of 13 to 15 ml/min.cm$^2$ (10 psi, 25° C.). It removed polystyrene latex particles (0.46 μm in diameter) at a rate of not less than 95%. It possessed an ability to effect perfect separation of the cells of genus Serratia marcescens.

As described above, the present invention relates to a method for the manufacture of a porous membrane by the steps of dissolving a polymer in a good solvent therefor, causing the resulting polymer solution to flow and spread in a uniform thickness on a substrate, and solidifying the resulting layer of the polymer solution in a bad solvent, which method is characterized by using a fluorinated hydrocarbon as the bad solvent and to the aforementioned method, which method is characterized by using a fluorinated hydrocarbon as the bad solvent, carrying out the removal of the good solvent mingling into the fluorinated hydrocarbon in the process of solidification by the technique of extraction from water, and using the fluorinated hydrocarbon repeatedly. This invention, therefore, enables the drying treatment of the porous membrane to be completed in a short span of time without requiring the treatment of heat application which is indispensable to the conventional method. Since the method of the present invention uses a non-flammable fluorinated hydrocarbon as the poor solvent, it enjoys high operational safety as compared with the conventional method and ovbiates the necessity for a special consideration such as the provision of an explosion-proof structure. Further, since the method of the second aspect of this invention permits the bad solvent to be easily purified by the technique of extraction from water, it enables the whole operational process to be effected quickly and inexpensively as compared with the conventional method which effects the refinement by fractional distillation.

The porous membrane obtained by the method of this invention exhibits an outstanding performance and manifests the aforementioned effects conspicuously when a fluorinated hydrocarbon selected from the group consisting of trichlorotrifluoroethane, tetrachlorodifluoroethane, dibromotetrafluoroethane, trichloromonofluoromethane, and mixtures thereof is used as a bad solvent, a fluorine type resin, specifically a fluorine type resin selected from the group consisting of vinylidene fluoride homopolymer, copolymers of vinylidene fluoride with other monomers, and combinations of such polymers with other polymers, is used as a polymer, and one member selected from the group consisting of dimethyl formamide, dimethyl acetamide, dimethyl sulfoxide, methylethyl ketone, acetone, tetrahydrofuran, and mixtures thereof is used as a good solvent and when paper or mixed paper is used as a substrate.

What is claimed is:

1. A method for the manufacture of a porous membrane comprising the steps of dissolving a polymer in a good solvent therefor to form a polymer solution, causing said polymer solution to flow and spread in a layer of uniform thickness on a substrate, and solidifying said layer of said polymer solution in a bad solvent therefor, wherein said bad solvent is a fluorinated hydrocarbon having substantially no compatibility with water, and removing said good solvent mingled into said fluorinated hydrocarbon during the course of solidification, by the technique of extraction from water, and using said fluorinated hydrocarbon repeatedly.

2. A method according to claim 1, wherein one fluorinated hydrocarbon, selected from the group consisting of trichlorotrifluoroethane, tetrachlorodifluoroethane, dibromotetrafluoroethane, trichloromonofluoromethane, and mixtures thereof is used as said bad solvent.

3. A method according to claim 1, wherein one fluorinated type resin is used as said polymer.

4. A method according to claim 1, wherein a fluorine type resin selected from the group consisting of vinylidene fluoride homopolymer, copolymers of vinylidene fluoride with other monomers, and combinations of such polymers with other polymers is used as said polymer.

5. A method according to claim 1, wherein one member selected from the group consisting of dimethyl formamide, dimethyl acetamide, dimethyl sulfoxide, methylethyl ketone, acetone, tetrahydrofuran, and mixtures thereof is used as said good solvent.

6. A method according to claim 1, wherein paper, mixed paper, polyester type film or polyolefine type film is used as said substrate.

7. A method according to claim 1, wherein the concentration of said polymer in said polymer solution is in the range of 10 to 25% by weight.

8. A method according to claim 1, wherein the thickness of the layer of said polymer solution is in the range of 100 to 1,000 μm.

9. A method according to claim 4, wherein vinylidene fluoride homopolymer is used as said fluorinated resin.

10. A method according to claim 1, wherein said layer of polymer solution on said substrate is removed from said bad solvent and then dried.

11. A method according to claim 10, wherein said layer of polymer solution removed from said solvent is dried at room temperature.

12. A method according to claim 11, wherein said good solvent and said bad solvent are separated from each other by extraction in water in a water-bubble extraction tank.

* * * * *